United States Patent Office 2,936,211
Patented May 10, 1960

2,936,211

ART OF PRODUCING POLYACRYLONITRILE FILAMENTS

Witold R. Kocay, Stamford, Conn., William J. Clark, Dunellen, N.J., and George P. Vescio, Yonkers, N.Y., assignors to American Cyanamid Company, New York, N.Y., a corporation of Maine No Drawing. Application April 18, 1957
Serial No. 653,529

6 Claims. (Cl. 8—55)

This invention relates broadly to the art of producing polyacrylonitrile filaments, and more particularly is concerned with the production of readily dyeable filaments from a filament-forming acrylonitrile polymer containing a basic monomer or monomers combined in the polymer molecules. The scope of the invention also includes the production of articles, e.g., fabrics in knitted, woven or other form, comprised of dyed filaments of a polymer of acrylonitrile.

Homopolymers of acrylonitrile and copolymers of acrylonitrile with other polymerizable organic compounds containing at least one ethylenic bond are, of course, known. These polymers have achieved wide use in the production of many valuable commercial products, e.g., synthetic rubber, and more recently, synthetic fibers.

Recent developments in the polymerization of acrylonitrile have been concerned largely with polymerization in aqueous medium, for instance, as described in Jacobson U.S. Patent No. 2,436,926 and Rothrock U.S. Patent No. 2,640,049; and with the use of redox-catalyst systems that aim to give a high yield of polymer in a short time at a moderate temperature.

To improve the dye-receptivity of the filamentary polyacrylonitrile it has been suggested in many patents that a basic monomer be copolymerized with the acrylonitrile to impart better dye-receptivity to the end product. The various vinylpyridines have been extensively used or proposed for this purpose. See, for example, Arnold U.S. Patent No. 2,491,471. The problems encountered in forming spinnable or fiber-forming copolymers of acrylonitrile and a vinylpyridine that are uniform from the standpoint of molecular-weight distribution and structure, and in other characteristics, are pointed out in the above-named Rothrock Patent No. 2,640,049. As the polymerization of acrylonitrile alone and with other polymerizable monomers is commonly carried out under acidic conditions when a redox-catalyst system is used, the acrylonitrile-vinylpyridine copolymer is obtained in the form of an addition salt thereof with the acid used in the polymerization process, e.g., nitric, hydrochloric, sulfuric, etc.

Polymers of acrylonitrile containing no basic modifying component can be readily washed substantially free of polyelectrolytes with water alone, but this is not true when the acrylonitrile polymer contains a basic group. When filaments or fibers are dry-spun from organic-solvent solutions of acrylonitrile polymer that also contains a vinylpyridine combined in the polymer molecule, no particular problems are generally encountered even though it be in the form of an addition salt of the polymer with the acid used in the polymerization process. However, when organic-solvent solutions of acrylonitrile-vinylpyridine copolymer containing bound anions are wet-spun into certain aqueous coagulating baths, e.g., an aqueous solution containing from about 3% to about 25% by weight of a water-soluble thiocyanate, difficulties frequently arise due to the fact that the polymer is converted into a thiocyanic acid salt when the polymer solution is extruded through the openings in a spinnerette to form a gelled filamentary material upon coming into contact with the said aqueous coagulating bath. Such difficulties commonly take the form of obtaining "off-shade" colors when efforts are made to dye the finished fiber or fabric with certain dyes, e.g., premetallized acid dyes; and excessive amounts of wash water are required to reduce the bound anions to a permissible minimum. Also, the wet fiber may absorb appreciable amounts of iron, which then may make itself evident as red streaks of iron thiocyanate in the wet fiber when a large amount of thiocyanic acid is bound with the polymer in the form of an addition salt.

The inventions disclosed and claimed in the copending applications, Serial No. 605,446, filed August 21, 1956, by Arthur Cresswell and Serial No. 605,269, filed August 21, 1956, by French et al. are directed to overcoming the foregoing difficulty.

Cresswell discloses and claims the invention, based on his discovery that in producing a gelled filamentary tow from a filament-forming inorganic salt of an acrylonitrile copolymer that also contains a vinylpyridine combined in the polymer molecule, by wet-spinning into an aqueous coagulating bath a solution of the said salt of said polymer to form a gelled tow, the bound anions in said tow may be substantially completely removed by contacting the gelled tow with an aqueous ammoniacal solution having a pH ranging between about 8 and about 11, preferably a pH of about 10.

The invention disclosed and claimed in the copending application of French et al. is based on the discovery that, in producing a filament-forming polymer of acrylonitrile that also contains a vinylpyridine combined in the polymer molecule, the aforementioned difficulties in producing and dyeing filaments made from the acrylonitrile polymer are obviated or minimized, and improved results are obtained, by contacting an inorganic acid salt formed by the said polymer with an alkaline liquid treating agent comprising an aqueous ammoniacal solution having a pH ranging from about 8 to about 11 in order to reduce substantially the amount of inorganic acid that is present in the salt of the said polymer. The thusly treated polymer, either with or without an intervening aging thereof for a period of at least twelve hours, is then washed with an approximately neutral fluid comprising water. Deionized water having a pH as low as, for example, 6.0 is suitable for this purpose, as also are other aqueous fluids comprising water that are approximately neutral. Washing with such aqueous fluids is for the purpose of removing from the polymer the ammoniacal salt that is present as a result of treating the polymer with the aforementioned aqueous ammoniacal solutions.

By practicing the above inventions, two simple and inexpensive means are provided for removing bound anions from the polymer, which anions if not substantially completely removed, would be converted into an objectionable form when the polymer is made into filaments by certain processes hereinbefore described. The treatment also removes any other impurities that are insoluble in an aqueous ammoniacal solution and which may affect, or tend to affect, the color, heat stability, or dye-receptivity of the finished fiber or filament. Furthermore, wet filaments made from the ammoniacal-treated polymers do not stain with iron in the form of, for example, ferrothiocyanate. The other useful properties of filaments made from the ammoniacal-treated polyacrylonitrile are not adversely affected, e.g., tenacity, elongation, water-resistance, abrasion-resistance, etc. This could have been in no way predicted especially in view of the well-known fact that polyacrylonitrile filaments, as normally produced, are attacked by certain other alkaline solutions upon prolonged immersion therein.

In evaluating the basic fiber produced by the inventions disclosed above, certain deficiencies have been discovered. The present invention resulted from the discovery of the reasons for these deficiencies and how to overcome them.

In making basic fibers by the processes disclosed and claimed in the aforementioned copending applications of Cresswell and of French et al., certain difficulties are encountered. For example, great care has to be taken in the drying of such fibers, as by the use of very carefully controlled, critical conditions of temperature and humidity, in order to obtain dried fibers having the completely and uniformly collapsed structure that is necessary for uniform, maximum dye-receptivity and a uniform dyeing rate. If the dried fiber is relatively high in porosity, the physical affinity of the dye for the fiber is lessened and, also, the chemical dye affinity that is built into the fiber by using a vinylpyridine as a comonomer. Also, the ammoniacal treatment of the polymer of acrylonitrile and/or of the gelled, polyacrylonitrile filaments usually gives, or tends to give, a lower level of dye-receptivity upon exposure to dry or humid heat, as shown by the results of, for example, the following comparative tests:

| Treatment of Fiber | Percent Dye Left in Dye-bath |
|---|---|
| Fiber as spun—air-dried | 10 |
| Fiber air-dried and then heat-treated at 250° F. for 20 minutes | 16 |
| Fiber air-dried and then humid heat-treated at 200° F. and 90% relative humidity for 20 minutes | 22 |

It is a primary object of the present invention to obviate or minimize the processing difficulties described above; and to produce a polyacrylonitrile fiber of the kind herein involved that has had its structure uniformly and substantially completely collapsed (i.e., relatively little or no porosity as evidenced by a relatively low surface area, e.g., not more than 10 m.$^2$/g.), which maintains its level of dye-receptivity substantially constant upon exposure to dry heat or humid heat, and which is uniformly dyeable at a uniform rate.

Other objects of the invention will be apparent to those skilled in the art from the following more detailed description.

The foregoing and other objects are accomplished by treating the acrylonitrile basic copolymer fiber in its wet, gelled filamentary form with an acid subsequent to the ammoniacal treatment. The acid treatment prior to drying facilitates collapse of the fiber structure, thus eliminating the porosity which cannot be easily accomplished by the drying alone. In addition, the acid-treated fiber does not show heat-sensitivity from the standpoint of level of dye-receptivity.

We are unable to explain with certainty the reasons why the treatment of the wet, gelled, polyacrylonitrile filaments in accordance with this invention should produce the surprising and unobvious results described above. However, there are several possible and logical explanations:

(1) The acid may have a plasticizing effect upon the gelled filaments so that the dehydration of the filaments is more closely associated with the collapse of the structure; in other words, each proceeds at a rate wherein one rate is essentially a mirror image of the other.

(2) The acid may act as an inhibitor of oxidation. (As is well known, oxidation is closely associated with the heat-sensitivity, and discoloration both initially and under heat, of a polyacrylonitrile fiber.)

(3) The presence of acid probably aids in maintaining equilibrium conditions not only during the drying operation but also during the dye application. For instance, in dyeing with an ionic (anionic or cationic) dye, chemical equilibrium exists because of the high ratio of ionized dye sites to total dye sites; while in dyeing with a non-ionic dye (e.g., vat and dispersed dyes), the uniformity of the fiber structure provides physical equilibrium.

Examples of acids falling within the scope of this invention are those having a dissociation constant of at least $1.76 \times 10^{-4}$, e.g., the mineral acids and certain organic and halogenated organic acids including formic, sulfuric, nitric, hydrochloric, phosphoric, pyrophosphoric, sulfurous, and the mono-, di- and tri-chloroacetic acids. Other examples of operative acids having the aforementioned minimum dissociation constant, and the temperature of measurement thereof (usually 25° C.), will be found in, for instance, the "Handbook of Chemistry and Physics," 29th ed., 1388–9 (1945), published by Chemical Rubber Publishing Company, Cleveland, Ohio. We prefer to use the mineral acids or the halogenated carboxylic acids, especially the chlorinated monocarboxylic acids.

The treating conditions will vary with, for example, the concentration of acid used, the strength of the acid, the time and temperature, and the ratio of treating liquor to filament (commonly called "liquor ratio"). Concentrations of from 2 grams to 50 grams per liter can be used at temperatures ranging from 5° C. to 90° C. and at a liquor ratio of from 2 to 1 to 50 to 1. The treating time will vary inversely with, for instance, the concentration and strength of the acid; and the choice of the time, temperature, concentration of acid and the liquor ratio is influenced by the depth of shade desired in the dyed filament. The treating conditions should be such as to give a substantially complete conversion of the free-base form fiber to a salt-form fiber.

It was discovered that the acid treatment applied to the wet gelled tow was effective in reducing porosity in the fiber whereas acid treatment applied to tow which had been air-dried prior to the acid treatment was much less effective in reducing the porosity of the fiber.

Fibers within the scope of the above-named inventions of Cresswell and French et al. and within the scope of the present invention are fibers spun from filament-forming copolymers of, by weight, from 80% to 96% acrylonitrile, from 2% to 10% of a vinylpyridine, and from 2% to 10% of at least one different monoethylenically unsaturated material, more particularly one containing a $CH_2=C<$ grouping and which is copolymerizable with the aforesaid acrylonitrile and vinylpyridine, e.g., vinyl esters including the formate, acetate, propionate, the various acrylic esters including the lower alkyl acrylates and methacrylates, the various acrylamides, acrylic acids, unsaturated alcohols, and others including those given by way of example in, for instance, Cresswell U.S. Patent No. 2,558,730, dated July 3, 1951 (column 3, lines 31–55), and Price U.S. Patent No. 2,736,722, dated February 28, 1956 (column 4, line 66 through column 5, line 27). The "third different monoethylenically unsaturated material" mentioned above includes within its meaning two or more such materials.

Vinylpyridines that may be employed include 2-vinylpyridine, 3-vinylpyridine, 4-vinylpyridine and vinylpyridines represented by the following formula:

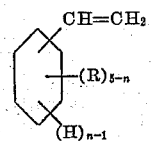

wherein R represents a lower alkyl radical (e.g., methyl to butyl, inclusive), and $n$ represents an integer from 1 to 5, inclusive. Other and more specific examples of vinylpyridines that can be used are given in the aforementioned copending applications of Cresswell and of French et al.

In order that those skilled in the art may better understand how the present invention can be carried into effect, the following examples are given by way of illustration and not by way of limitation. All parts and percentages are by weight.

Example 1

Eighty-seven and one-half percent (87.5%) acrylonitrile, 7.5% vinyl acetate and 7.5% 2-methyl-5-vinylpyridine were copolymerized under acidic conditions produced by the addition of nitric acid, and the nitric acid salt formed with the said polymer was subsequently mixed with an aqueous solution of ammonia, the resulting mixture having a pH ranging from about 8 to about 11. The resulting polymer was subsequently washed with approximately neutral water. This polymer was dissolved in 48% sodium thiocyanate to 10.08% solids. The resulting spinning solution was extruded through a spinnerette having 2330 holes, each 90 microns in diameter, into a coagulating bath of 10% sodium thiocyanate at 0° C. The total stretch applied was 697%, and the final speed of spinning was 60 meters per minute. In addition to the ammonia treatment of the polymer a sample of this tow, before being examined from the dyeability standpoint, was washed for 24 hours in 0.05 N $NH_3$.

A swatch of the air-dried, ammonia-treated polyacrylonitrile fiber had a white color, but showed a lack of lustre indicating that this might be due to porosity in the fiber. Acid treatment was therefore applied to the stretched, wet gel. The treating conditions were: soaking the fiber for four hours at about 50° C. with a 10% sulfuric acid solution and a 40-to-1 liquor ratio and washing the fiber free of excess acid. After subsequent air-drying, the sample appeared to be glossy. Acid treatment was also applied to a sample of fiber which had been air-dried. This sample appeared somewhat milky white, indicating some residual porosity.

A lot of gelled filamentary tow was treated as above with sulfuric acid prior to the stretch to form a salt-form basic tripolymer fiber. With a chrome dye and an acid premetallized dye very good unions were obtained in blends of 50% of the above-mentioned fiber and 50% wool. This lot, when dyed with Calcochrome Fast Red ECB (C.I. No. 18,760), showed very good dye exhaust and uniformity without streaks, spots or any faults in either "as-spun" form or after dry or humid heat treatment. The dye exhaust of this lot was approximately 95%. Against wool this lot dyed heavy; good union.

Dyeing carried out using an acid dye, 2% Calcocid Alizarine Blue SAPG (C.I. No. 63,010), and a liquor ratio of 50 to 1 for 1 hour at the boil with 5% $Na_2SO_4$ and 4% $H_2SO_4$ added to the dye bath showed a dyebath exhaust of 99%.

Example 2

Samples of treated tow were subsequently dyed with 2% Calcofast Wool Bordeaux RB Concentrate (C.I. Acid Red 190), at 5% sulfuric acid and 5% sodium sulfate calculated on the weight of the tow. The first lot was tow made from the ammonia-washed polymer and included an ammonia treatment of the tow during processing; and a second lot, which differed from the first lot in that it was subsequently treated with nitric acid. The results are shown below:

| Fiber Sample and Treatment | Spectrophotometric Readings, Percent Dye Left in Dyebath |
|---|---|
| Ammonia Treated Polymer and Tow: | |
| 1. As is | 33 |
| 2. Heat treated 250° F. for 20 minutes | 41 |
| 3. Humid heat treated 200° F. and 90% R.H. for 20 minutes | 43 |
| Subsequent Acid Treatment of Tow: | |
| 4. Same as 1 | 9 |
| 5. Same as 2 | 12 |
| 6. Same as 3 | 9 |

These figures show the effect that the acid treatment of the wet gel tow has in reducing the heat-sensitivity and, in particular, the humid heat-sensitivity of a fiber as to its dye-receptivity. Subsequent evaluations using hydrochloric acid and phosphoric acid gave similar results although three times as much phosphoric acid had to be used in order to give as good dyed unions with wool.

Example 3

Ammonia-treated wet gel tow was (1) treated with nitric acid at 10 g. per liter for four hours at 50° C., (2) dried for four hours at 160° F., (3) passed through a pre-shrinking process, and (4) dried again and examined as to its dyeability. Samples of fiber, taken at each of these four points as it is and samples exposed to drying and to humid heat, were all combined and dyed competitively with 2% Calco Fast Wool Bordeaux RB Concentrate (C.I. Acid Red 190) and 5% sulfuric and 5% sodium sulfate, based on the weight of the fiber. The results obtained indicated satisfactory uniformity on all the fibers. The differences in heat-sensitivity of the fibers from the practical point of judgment were much too small to be considered significant.

Following these results experiments were made to determine, if possible, time limits for the acid treatment. The range under investigation was from four hours at 50° C. and from one hour at 70° C. down to a ten-minute period of treatment at 70° C. The ten-minute period produced satisfactory results; likewise, 4 hours at 50° C.

Example 4

A terpolymer was made from a monomeric mixture of 7.5% methyl acrylate, 7.5% 2-methyl-5-vinylpyridine and 85% acrylonitrile by polymerizing in an aqueous medium with an oxidation-reduction catalyst system comprised of chloric acid and sulfurous acid, in the presence of a small amount of nitric acid. The resulting terpolymer contained in combined state about 85% acrylonitrile, about 5.4% 2-methyl-5-vinylpyridine, about 7.5% methyl acrylate, and about 2.1% of combined nitric acid which resisted washing out with water. This polymer was dissolved in 50% aqueous sodium thiocyanate to make a solution containing 9.5% by weight of the polymer. After deaeration and filtration the polymer solution was preheated and then extruded through a spinnerette into 10% aqueous sodium thiocyanate coagulating bath at −2° C. The coagulated gel filaments formed thereby were then washed with either water or water containing either 0.1%, 0.3%, or 0.5% ammonia, the washing condition in each case otherwise being identical. The pH of the aqueous ammonia solutions in all cases was within the range of 8 to 11. Analysis of washed threads before stretching showed the following:

| Wash | Percentage Thiocyanate Calculated as Sodium Thiocyanate |
|---|---|
| Water | 1.85 |
| 0.1% ammonia | 0.12 |
| 0.3% ammonia | 0.06 |
| 0.5% ammonia | 0.06 |

Subsequent to the above steps of extrusion and washing, each gelled multifilament thread was stretched to nine times its extruded length in water maintained at about 98° C. Following stretching, the thread was continuously dried with application of an anti-static agent, and finally was shrunken 15% by passage through a zone maintained at 40° C. All of the finished yarns were found to have essentially identical stress-strain characteristics. Swatches of the washed, dried and shrunken threads were individually dyed with premetallized acid dyes. Those which had been ammonia-washed were on shade, that is, the color shade was that which is normally obtained with the individual dye; while the dyed swatch which had been washed with water alone was off shade. Although the three swatches prepared from the ammonia-washed polymer were on shade, they were quite unattractive, showing streaks and spots in great abundance.

Therefore, wet gel tow produced as above was treated with 10 g. per liter of nitric acid at 50° C. for thirty minutes and rinsed at 50° C. and dried. Swatches of this fiber were exposed to various dry and humid heat conditions, and then were dyed competitively with wool, using premetallized acid dyes. Very good unions were obtained, with no streaks or spots. The dyebaths were practically completely exhausted and deep even colorings were obtained.

Other variations within the spirit and scope of the present invention will be apparent to those skilled in the art from the foregoing description.

We claim:

1. In a process for producing filaments having increased dye-receptivity from a filament-forming copolymer of, by weight, from 80% to 96% acrylonitrile, from 2% to 10% of a vinylpyridine and from 2% to 10% of a different monoethylenically unsaturated material in which the gelled filamentary material, formed by wet-spinning said copolymer into a coagulating bath containing from about 3% to about 25% by weight of a water soluble thiocyanate, is then substantially freed from bound anions by a treatment with an ammoniacal solution, the improvement which comprises contacting the said resulting gelled filamentary material with an aqueous solution of an acid having a dissociation constant of at least $1.76 \times 10^{-4}$, thereby converting said wet, gelled material substantially completely to the acid salt form, washing said material free of excess said and drying the washed filamentary material.

2. The improvement in claim 1 wherein the acid used is nitric acid.

3. The improvement in claim 1 wherein the acid used is sulfuric acid.

4. In a process for producing an article comprised of dyed filaments of a filament-forming copolymer of, by weight, from 80% to 96% acrylonitrile, from 2% to 10% of a vinylpyridine and from 2% to 10% of a different monoethylenically unsaturated material in which the gelled filamentary material formed by wet-spinning said copolymer into a coagulating bath containing from about 3% to about 25% by weight of a water soluble thiocyanate, is then substantially freed from bound anions by a treatment with an ammoniacal solution, the improvement which comprises contacting the said resulting wet, gelled material with an aqueous solution of an acid having a dissociation constant of at least $1.76 \times 10^{-4}$, converting said filamentary material substantially completely to the acid salt form, washing said material free of excess acid, drying the washed material, and dyeing an article comprised of the dried filamentary material in a bath of an acid-type dye.

5. The improvement as in claim 4 in which the acid used is nitric acid.

6. The improvement as in claim 4 in which the acid used is sulfuric acid.

References Cited in the file of this patent

UNITED STATES PATENTS

| | | |
|---|---|---|
| 2,548,853 | Baker | April 17, 1951 |
| 2,558,735 | Cresswell | July 3, 1951 |

FOREIGN PATENTS

| | | |
|---|---|---|
| 905,038 | France | Nov. 22, 1945 |
| 719,087 | Great Britain | Nov. 24, 1954 |
| 718,734 | Great Britain | Nov. 17, 1954 |

UNITED STATES PATENT OFFICE

CERTIFICATE OF CORRECTION

Patent No. 2,936,211　　　　　　　　　　　　　　　　May 10, 1960

Witold R. Kocay et al.

It is hereby certified that error appears in the printed specification of the above numbered patent requiring correction and that the said Letters Patent should read as corrected below.

Column 7, line 36, for "said" read -- acid --.

Signed and sealed this 11th day of October 1960.

(SEAL)
Attest:
KARL H. AXLINE
Attesting Officer

ROBERT C. WATSON
Commissioner of Patents